(12) United States Patent
He et al.

(10) Patent No.: US 9,343,098 B1
(45) Date of Patent: May 17, 2016

(54) METHOD FOR PROVIDING A HEAT ASSISTED MAGNETIC RECORDING TRANSDUCER HAVING PROTECTIVE PADS

(71) Applicant: Western Digital (Fremont), LLC, Fremont, CA (US)

(72) Inventors: Li He, Fremont, CA (US); Yunfei Li, Fremont, CA (US); Jerome S. Marcelino, Mountain View, CA (US); Ronghui Zhou, Fremont, CA (US); Ge Yi, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 13 days.

(21) Appl. No.: 14/054,762

(22) Filed: Oct. 15, 2013

Related U.S. Application Data

(60) Provisional application No. 61/869,144, filed on Aug. 23, 2013.

(51) Int. Cl.
*B44C 1/22* (2006.01)
*G11B 13/04* (2006.01)
*G11B 5/008* (2006.01)

(52) U.S. Cl.
CPC .......... *G11B 13/045* (2013.01); *G11B 5/00826* (2013.01)

(58) Field of Classification Search
CPC .... G11B 5/008; G11B 5/00826; G11B 5/187; G11B 5/4866; G11B 5/3116; G11B 5/3123; G11B 5/3163; G11B 13/00; G11B 13/02; G11B 13/04; G11B 13/045; G11B 2005/0029; G11B 5/11

USPC ........ 216/13, 18, 22, 23, 24, 27, 56; 438/717, 438/720
See application file for complete search history.

(56) References Cited

U.S. PATENT DOCUMENTS

| | | |
|---|---|---|
| 5,909,340 A | 6/1999 | Lairson et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |

(Continued)

*Primary Examiner* — Lan Vinh

(57) ABSTRACT

A method fabricates a heat assisted magnetic recording (HAMR) transducer having an air-bearing surface (ABS) and that is optically coupled with a laser. The method includes providing a waveguide for directing light from the laser toward the ABS and providing a write pole having a pole tip with an ABS location facing the surface. The pole tip is in a down track direction from the waveguide. The method also includes providing at least one shield including a shield pedestal. The shield pedestal is in the down track direction from the pole tip. At least one protective pad is provided adjacent to the write pole and between the ABS location and the shield pedestal.

20 Claims, 13 Drawing Sheets

(56) References Cited

U.S. PATENT DOCUMENTS

| | | |
|---|---|---|
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,156,375 A | 12/2000 | Hu et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,560,855 B1 | 5/2003 | Nakamura et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |

(56) References Cited

U.S. PATENT DOCUMENTS

| | | |
|---|---|---|
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,788,497 B1 | 9/2004 | Cates |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,867,940 B2 | 3/2005 | Pleiss |
| 6,870,712 B2 | 3/2005 | Chen et al. |
| 6,873,494 B2 | 3/2005 | Chen et al. |
| 6,873,547 B1 | 3/2005 | Shi et al. |
| 6,876,526 B2 | 4/2005 | Macken et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,092,208 B2 | 8/2006 | Zou et al. |
| 7,102,853 B2 | 9/2006 | Macken et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,123,447 B2 | 10/2006 | Pendray et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,184,244 B1 | 2/2007 | Haddock et al. |
| 7,193,814 B2 | 3/2007 | Han et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,408 B2 | 11/2007 | Chiu et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,320,168 B2 | 1/2008 | Han et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |

(56) References Cited

U.S. PATENT DOCUMENTS

| | | |
|---|---|---|
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,505,227 B2 | 3/2009 | Lee et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,532,434 B1 | 5/2009 | Schreck et al. |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,593,183 B2 | 9/2009 | Hsiao et al. |
| 7,595,967 B1 | 9/2009 | Moon et al. |
| 7,639,457 B1 | 12/2009 | Chen et al. |
| 7,652,853 B2 | 1/2010 | Hosseinali et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,885,029 B2 * | 2/2011 | Miyauchi et al. ............... 360/59 |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,240,026 B2 | 8/2012 | Kagami et al. |
| 8,248,891 B2 | 8/2012 | Lee et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,556 B2 | 10/2012 | Ruiz |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |

(56) References Cited

U.S. PATENT DOCUMENTS

| | | | |
|---|---|---|---|
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,861,317 B1 * | 10/2014 | Yan et al. ............ 369/13.33 |
| 2004/0125478 A1 | 7/2004 | Kim et al. |
| 2010/0290157 A1 | 11/2010 | Zhang et al. |
| 2011/0086240 A1 | 4/2011 | Xiang et al. |
| 2011/0188354 A1 * | 8/2011 | Sasaki et al. ............ 369/13.32 |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0070576 A1 | 3/2013 | Zou et al. |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0043948 A1 * | 2/2014 | Hirata et al. ............ 369/13.24 |
| 2014/0154529 A1 | 6/2014 | Yang et al. |
| 2014/0175050 A1 | 6/2014 | Zhang et al. |

\* cited by examiner

METHOD FOR PROVIDING A HEAT ASSISTED MAGNETIC RECORDING TRANSDUCER HAVING PROTECTIVE PADS

CROSS-REFERENCE TO RELATED APPLICATIONS

This application claims priority to provisional U.S. Patent Application Ser. No. 61/869,144, filed on Aug. 23, 2013, which is hereby incorporated by reference in its entirety.

BACKGROUND

FIG. 1 depicts a side view of a portion a conventional HAMR disk drive 100. For clarity, FIG. 1 is not to scale. For simplicity not all portions of the conventional HAMR disk drive 10 are shown. The HAMR disk drive 10 includes media 12, a slider 15, a HAMR head 20, and a laser assembly 30. Although not shown, the slider 15 and thus the laser assembly 30 and HAMR transducer 20 are generally attached to a suspension (not shown). The HAMR transducer 20 includes an air-bearing surface (ABS) proximate to the media 12 during use. The HAMR transducer 12 includes a waveguide 22, write pole 24, coil(s) 26 and near-field transducer (NFT) 28. The waveguide 22 guides light to the NFT 28, which resides near the ABS. The NFT 28 focuses the light to magnetic recording media 12, heating a region of the magnetic media 12 at which data are desired to be recorded. High density bits can be written on a high coercivity medium with the pole 24 energized by the coils 26 to a modest magnetic field.

Although the conventional HAMR disk drive 10 functions, there are drawbacks. The pole 24 and NFT 28 include regions that are at the air-bearing surface (ABS). These regions may be surrounded by materials such as alumina and silica. The pole 24 and/or NFT 28 may inadvertently contact the media 12 or may come into contact with the media 12 during touchdown. As a result, structures in the HAMR transducer 12 may be subject to damage.

Accordingly, what is needed is an improved HAMR transducer having improved robustness and/or reliability.

DETAILED DESCRIPTION OF THE PREFERRED EMBODIMENTS

Figure 1:
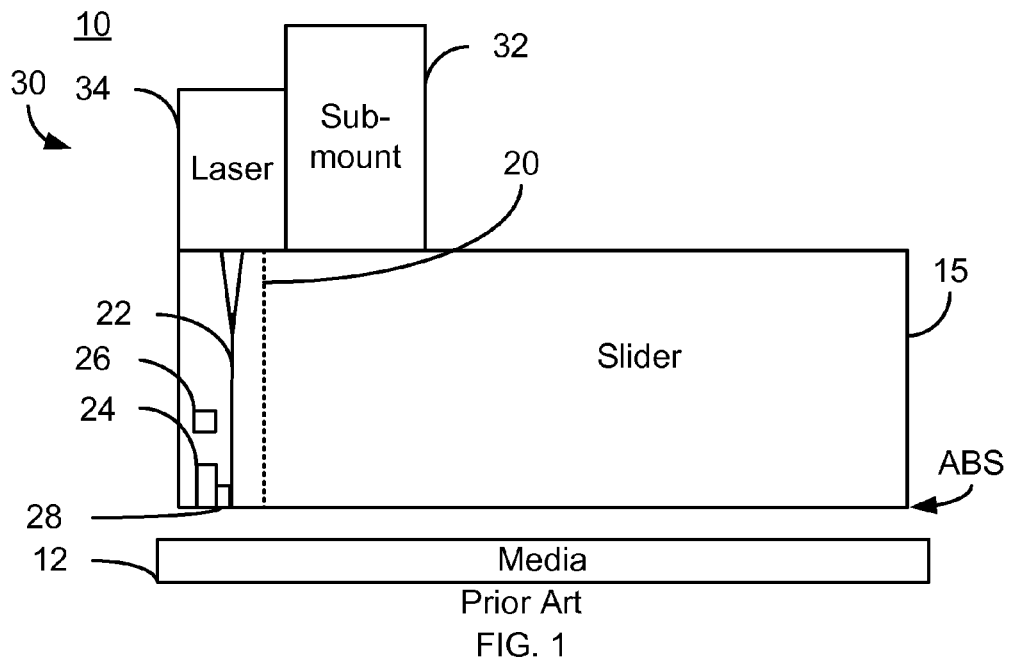
FIG. 1 is a diagram depicting a conventional HAMR disk drive.
Figure 2:
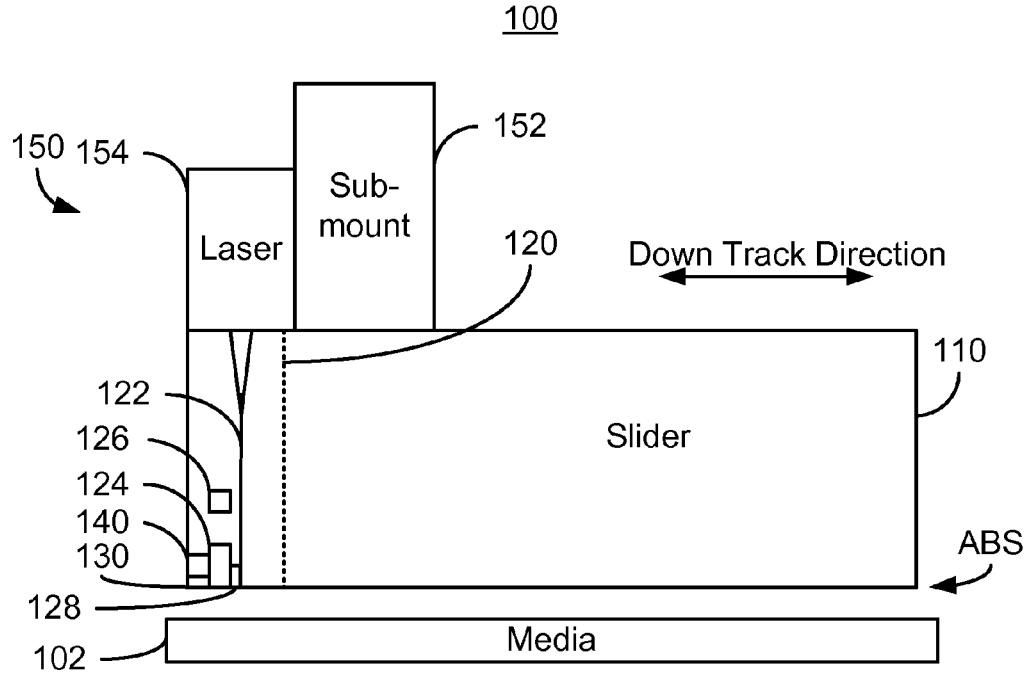
FIG. 2 is a diagram depicting an exemplary embodiment of a HAMR disk drive.
Figure 3A:
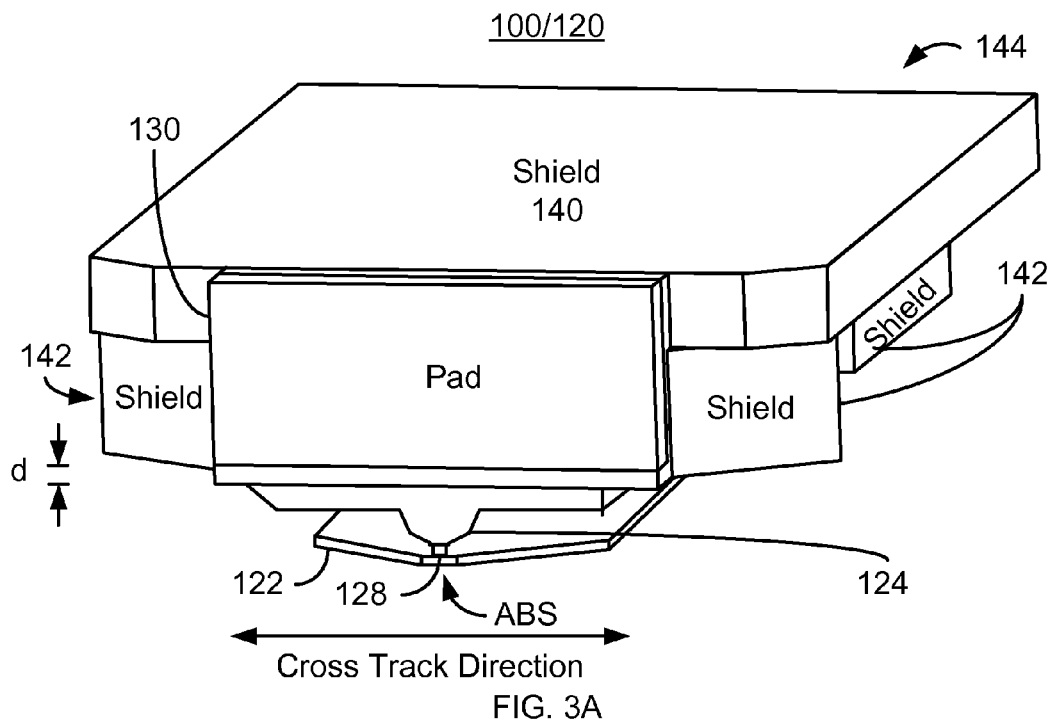
FIGS. 3A-3B are perspective views of another exemplary embodiment of a portion of a HAMR disk drive.
Figure 3B:
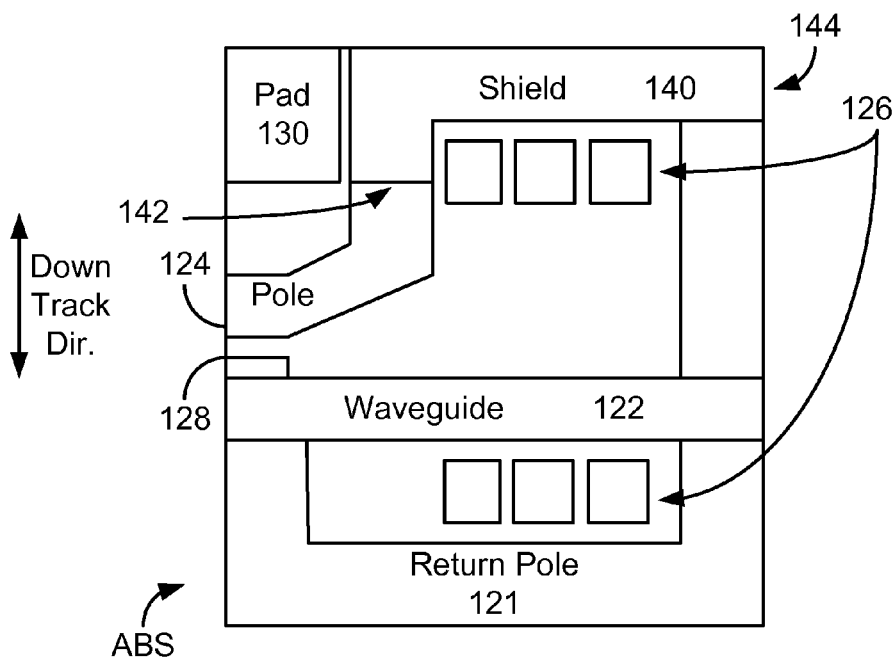

FIG. 2 depicts a side view of an exemplary embodiment of a portion of a HAMR disk drive 100 including a write transducer 120. FIGS. 3A and 3B depict perspective and side views, respectively, of the HAMR transducer 120. For clarity, FIGS. 2, 3A and 3B are not to scale. Referring to FIGS. 2, 3A and 3B, for simplicity not all portions of the HAMR disk drive 100 are shown. In addition, although the HAMR disk drive 100 is depicted in the context of particular components other and/or different components may be used. For example, circuitry used to drive and control various portions of the HAMR disk drive 100 is not shown. For simplicity, only single components 102, 110, 120 and 150 are shown. However, multiples of each components 102, 110, 120, and/or 150 and their sub-components, might be used.

The HAMR disk drive 100 includes media 102, a slider 110, a HAMR transducer 120, and a laser assembly 150. Additional and/or different components may be included in the HAMR disk drive 100. Although not shown, the slider 110, and thus the laser assembly 150 and HAMR transducer 120 are generally attached to a suspension (not shown). The laser assembly 150 includes a submount 152 and a laser 154. The submount 152 is a substrate to which the laser 154 may be affixed for improved mechanical stability, ease of manufacturing and better robustness. The laser 154 may be a chip such as a laser diode. Thus, the laser 154 typically includes at least a resonance cavity, a gain reflector on one end of the cavity, a partial reflector on the other end of the cavity and a gain medium. For simplicity, these components of the laser 154 are not shown in FIG. 2. In some embodiments, the laser 154 may be an edge emitting laser, a vertical surface emitting laser (VCSEL) or other laser.

The HAMR transducer 120 is fabricated on the slider 110 and includes an air-bearing surface (ABS) proximate to the media 102 during use. In general, the HAMR transducer 120 includes a write transducer and a read transducer. However, for clarity, only the write portion of the HAMR head 120 is shown. The HAMR head 120 includes a waveguide 122, write pole 124, coil(s) 126, near-field transducer (NFT) 128, protective pad(s) 130 and shield(s) 140. In other embodiments, different and/or additional components may be used in the HAMR head 120. The waveguide 122 guides light to the NFT 128, which resides near the ABS. The NFT 128 utilizes local resonances in surface plasmons to focus the light to magnetic recording media 102. At resonance, the NFT 128 couples the optical energy of the surface plasmons efficiently into the recording medium layer of the media 102 with a confined optical spot which is much smaller than the optical diffraction limit. This optical spot can rapidly heat the recording medium layer to near or above the Curie point. High density bits can be written on a high coercivity medium with the pole 124 energized by the coils 126 to a modest magnetic field. The write pole 124 is thus formed of high saturation magnetization material(s) such as CoFe.

In operation, the laser 154 emits light that is provided to the waveguide 122. The waveguide 122 directs the light to the NFT 128. The NFT 128 focuses the light to a region of magnetic recording media 102. High density bits can be written on a high coercivity medium with the pole 124 energized by the coils 126 to a modest magnetic field.

In addition, the HAMR transducer 120 includes protective pad 130 and shield 140. The shield 140 may include a pedestal 142 and a top shield 144. The shield 140 is recessed from the ABS, as depicted in FIGS. 2 and 3B. In the absence of the protective pad 130, therefore, the some other material would reside between the shield(s) 140 and the ABS. For example, if the protective pad 130 were not present alumina or silicon dioxide might reside between the shield 140 and the ABS. The protective pad 130 is termed "protective" because in some embodiments, the protective pad may protect the NFT 128 and the pole 124 if the transducer 120 inadvertently contacts the media 102. Although shown in the down track direction from the pole 124, at least some of the protective pad 130 may reside in the cross track direction from the pole 124. In some embodiments, the protective pad 130 includes magnetic material. In other embodiments the protective pad 130 includes nonmagnetic material(s). For example, the protective pad 130 may include at least one of NiFe, tantalum oxide, CoNiFe, Ta and aluminum nitride. In some embodiments, the protective pad 130 includes or consists of material(s) that have substantially the same etch and/or lapping characteristics as the pole 124. In some embodiments, the protective pad 130 includes or consists of material(s) that have substantially the same etch and lapping characteristics as the shield(s) 140. The protective pad 130 may also have substantially the same thermal characteristics as the pole 124 and surrounding structures. For example, the protective pad 130 may have substantially the same thermal conductivity as the pole 124. In addition, the material(s) used for the pad 130 are desired to have little or no impact on the optical and magnetic performance of the transducer 120.

The pad 130 may improve the performance and robustness of the HAMR transducer 120. In particular, the pad 130 may improve the wear resistance of the HAMR transducer 120. The pad 130 may have substantially the same etch and lapping characteristics as the pole 124. In such embodiments, the removal rate of the pad 130 during fabrication is substantially the same as the pole 124. Thus, the pole 124 may not protrude from the ABS with respect to surrounding structures. Instead, the recession of the pole 124 may be approximately the same as the pad 130. This may be in contrast to the conventional HAMR transducer 20, in which aluminum oxide or silicon dioxide structures surrounding the pole 24 are recessed from the pole because the surrounding structures' removal rates are greater than that of the pole 24. Thus, the pad 130 may reduce the likelihood of or prevent the pole 124 from being the closest point to the media 102. As a result, the pad 130 may protect the pole 124 if the transducer 120 contacts the media 102. The pad 130 may also protect the pole 124 during touchdown. This is particularly true if the pad 130 is sufficiently large at the ABS. If the pad 130 has similar thermal properties to the pole 124, then expansion or contraction of the structures 130 and 124 may be similar during operation of the HAMR disk drive 100. Thus, the pad 130 may still protect the pole 124 from wear or other physical damage. The pad 130 may be of nonmagnetic material or magnetic material configured to reduce their impact to the magnetics of the HAMR transducer 120. Thus, the pole 124 used in writing to the media 102 may be protected from damage and/or wear. Thus, performance and robustness of the HAMR transducer 100 may be improved.

Figure 4:
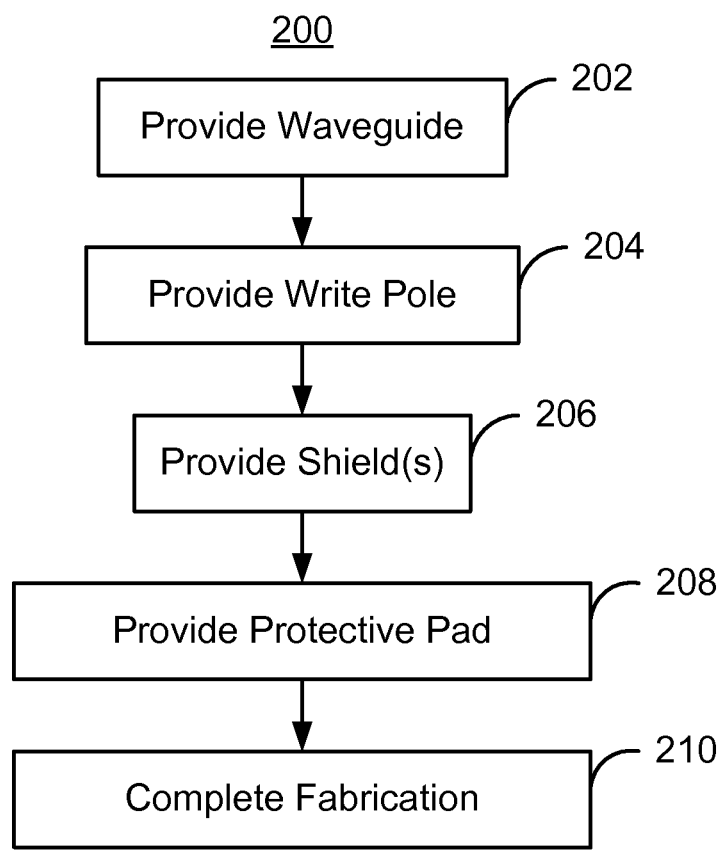
FIG. 4 depicts a flow chart depicting an exemplary embodiment of a method for fabricating a HAMR transducer.

FIG. 4 is a flow chart depicting an exemplary embodiment of a method 200 for fabricating a HAMR transducer. The method 200 is described in the context of the HAMR transducer 120, though other transducers might be so fabricated. For simplicity, some steps may be omitted, performed in another order, interleaved and/or combined. The magnetic recording transducer being fabricated may be part of a merged head that also includes a read head (not shown) and resides on a slider in a disk drive. The method 200 is also described in the context of a single transducer. However, the method 200 may be used to fabricate multiple transducers at substantially the same time. The method 200 and system are also described in the context of particular layers and particular structures. However, in some embodiments, such layers may include multiple sub-layers and/or other structures. The method 200 also may commence after formation of other portions of the transducer.

The waveguide 122 is also provided, via step 202. An NFT 128 may also be provided as part of step 202. A write pole 124 is provided, via step 204. The shield 140 including the may be provided, via step 206. Steps 202, 204 and 206 typically include multiple substeps. The protective pad 130 is provided, via step 208. Step 208 may include depositing the desired materials and patterning the materials. Fabrication may then be completed, via step 210. Step 210 may include etching and/or lapping the transducer being fabricated.

Figure 5:
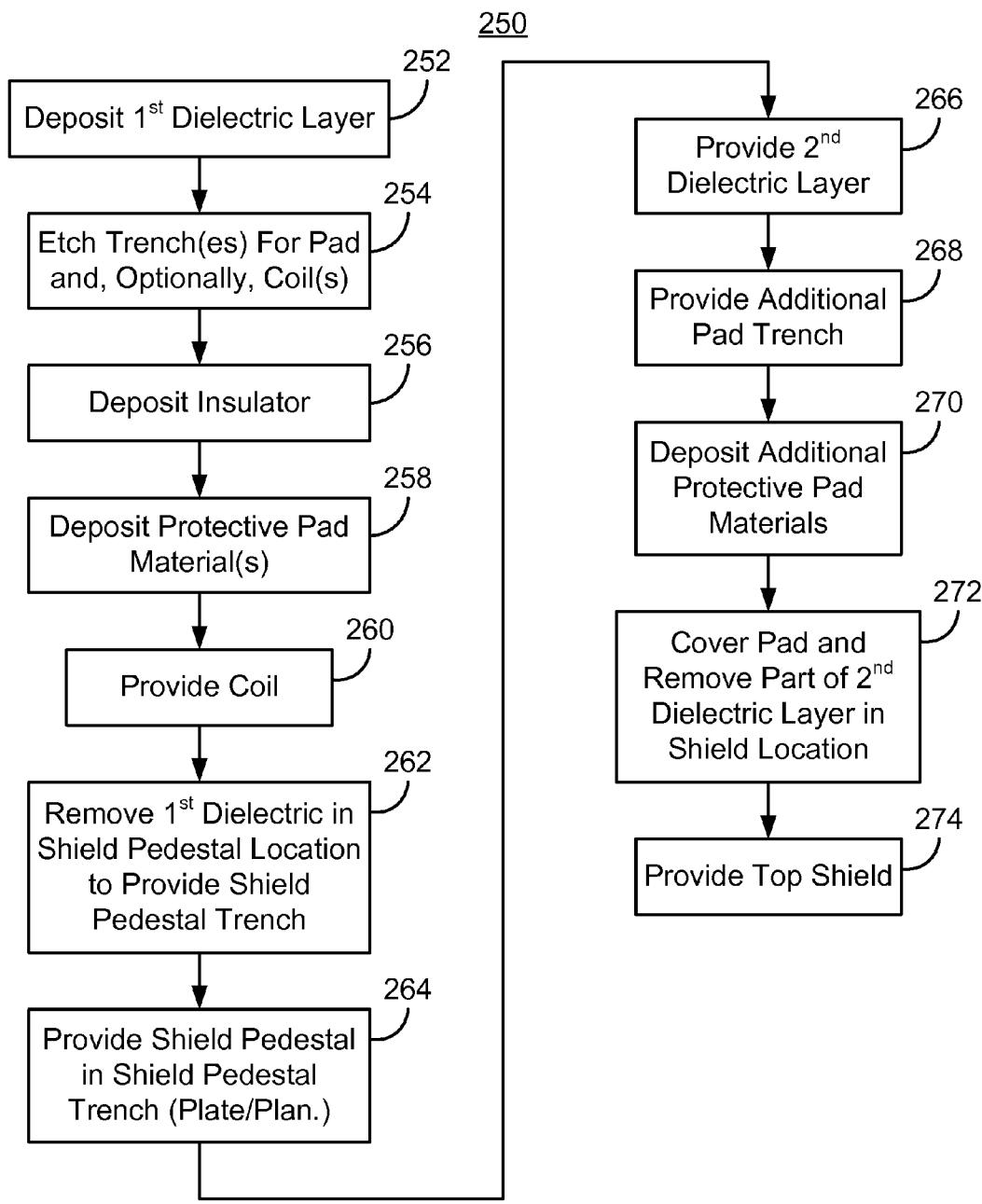
FIG. 5 depicts a flow chart depicting an exemplary embodiment of a method for fabricating a HAMR transducer.

FIG. 5 is a flow chart depicting an exemplary embodiment of a method 250 for fabricating a HAMR transducer. FIGS. 6A-6J depict an exemplary embodiment of a HAMR transducer 300 during formation using the method 250. The method 250 is described in the context of the HAMR transducer 300, though other transducers might be so fabricated. For simplicity, some steps may be omitted, performed in another order, and/or combined. The magnetic recording transducer being fabricated may be part of a merged head that also includes a read head (not shown) and resides on a slider in a disk drive. The method 250 is also described in the context of a single transducer. However, the method 250 may be used to fabricate multiple transducers at substantially the same time. The method 250 and system are also described in the context of particular layers and particular structures. However, in some embodiments, such layers may include multiple sub-layers and/or other structures. The method 250 also may commence after formation of other portions of the transducer.

Figure 6A:
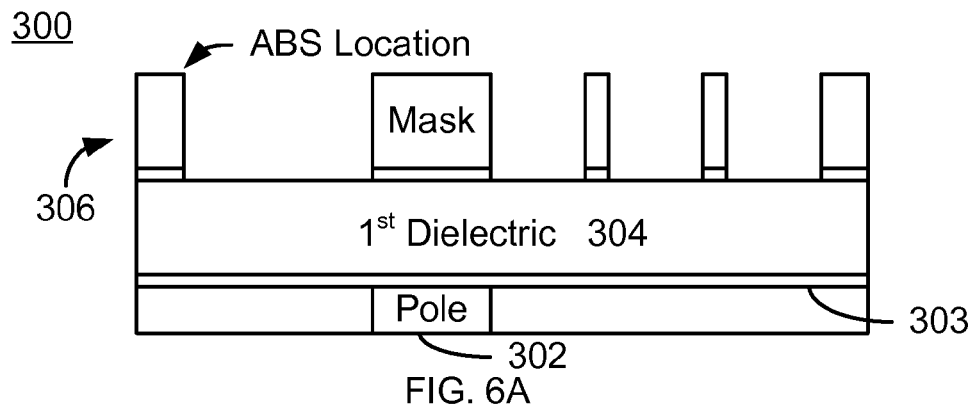
FIGS. 6A-6J are side views of another exemplary embodiment of a HAMR head disk drive during fabrication.
Figure 6B:
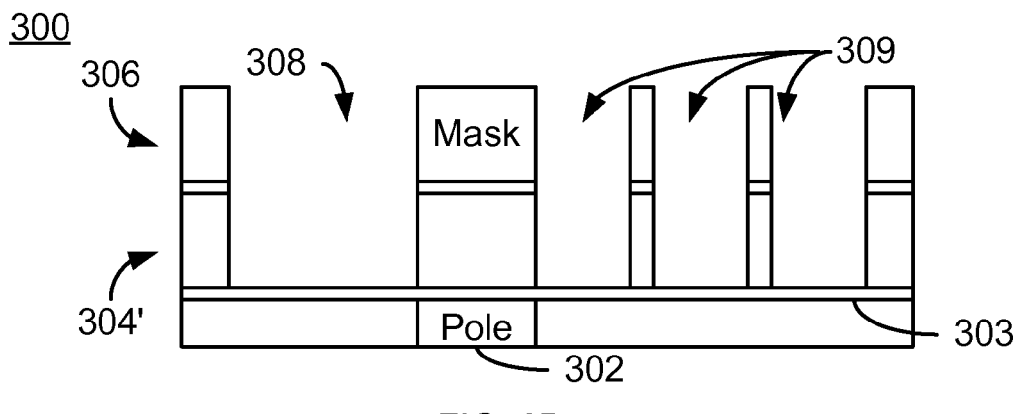

The method 250 starts after formation of the pole. A first dielectric layer is provided, via step 252. In some embodiments, an additional insulating layer is deposited before the dielectric layer. For example, the dielectric layer may be aluminum oxide or silicon dioxide. Trenches are etched in the first dielectric layer, via step 254. In some embodiments, trenches for both the coil(s) and the pad are formed in step 254. For example, a mask having apertures in locations corresponding to the pad and coil(s) may be provided on the first dielectric layer. A reactive ion etch (RIE) or other etch appropriate to the first dielectric layer may then be performed. For example, a silicon dioxide or aluminum oxide RIE may be performed in step 254. FIG. 6A depicts the transducer 300 during step 254. Thus, the pole 302 and optional insulating layer 303 are shown. The insulating layer 303 may be used as an etch stop layer. The dielectric layer 304 is also shown. In some embodiments, the dielectric layer 304 is on the order of two micrometers thick. In some embodiments, a thin NiFe layer (not shown in FIGS. 6A-6J) is deposited at least on the pole 302 to serve as a stop layer and to protect the underlying pole 302. In some embodiments, such a NiFe layer is at least two hundred Angstroms thick and not more than three hundred Angstroms thick. The mask 306 having apertures in locations corresponding to the protective pad and the coil is also shown. Also depicted in FIG. 6A is the ABS location. The ABS location is the location that corresponds to the ABS once fabrication of the HAMR transducer 300 is completed. FIG. 6B depicts the transducer 300 after step 254 is completed. Thus, the trenches 308 and 309 may be formed in the first dielectric layer 304'. The bottoms of these trenches may be at the insulating layer 303. The trench 308 corresponds to the protective pad, while the trenches 309 correspond to the coil (s). In some embodiments, the trenches 309 are for a single coil, that may be part of a helical or pancake coil.

Figure 6C:
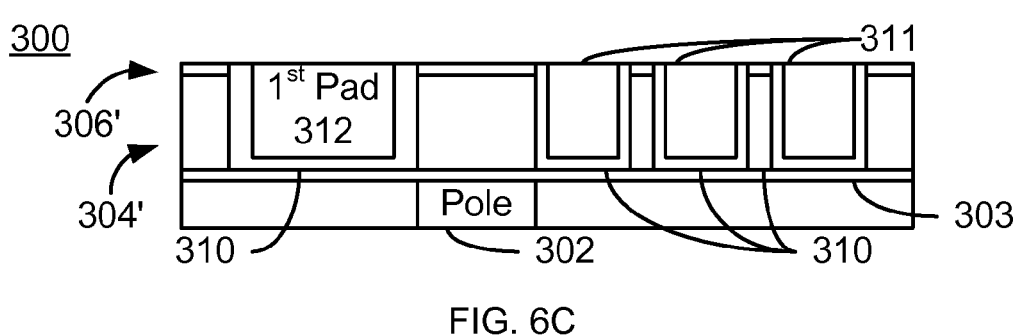

An insulating layer, such as aluminum oxide, may be deposited, via step 256. The material deposited in step 256 may be used to ensure that the desired spacing is provided between the protective pad, shield, and other components. Material(s) for the protective pad may then be provided, via step 258. For example, step 258 may include depositing a seed layer, plating a layer or material such as NiFe, and performing a planarization. FIG. 6C depicts the transducer 300 after step 258 has been performed. Thus, the insulator 310 and first layer of the protective pad 312 are shown. The protective pad 312 is in the trench 308. In addition, pad material 311 has also been deposited in trenches 309. However, this pad material 311 is sacrificial and is removed in subsequent steps. Thus, using steps 252, 254, 256 and 258 a portion of the protective pad is formed. In some embodiments, therefore, steps 252, 254, 256 and 258 may be considered to be part of step 208 of the method 200 depicted in FIG. 4.

Figure 6D:
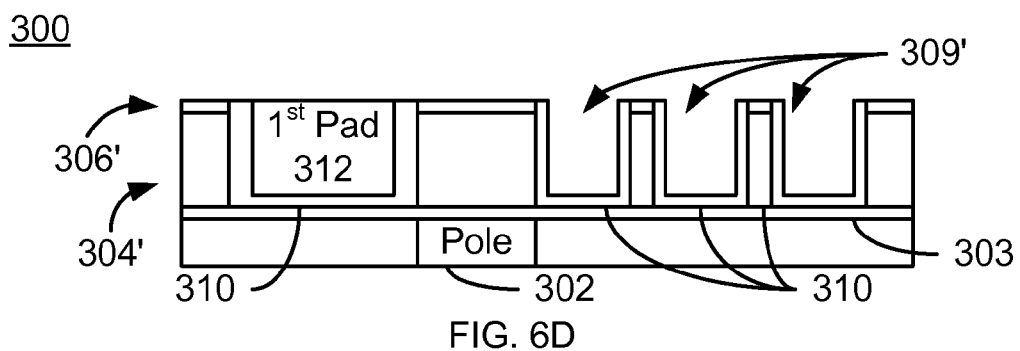
Figure 6E:
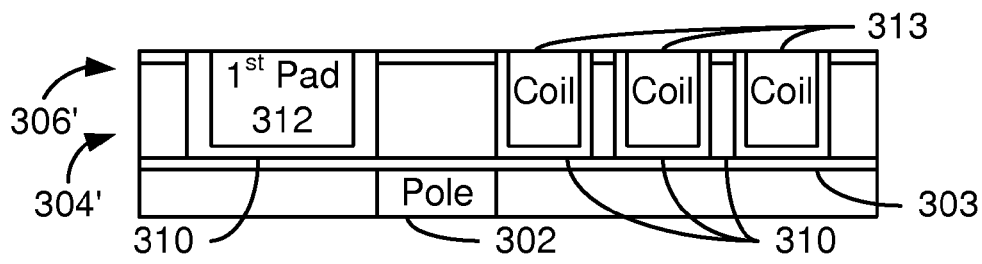

Referring back to FIGS. 5 and 6A-6J, the coils are provided via step 260. Step 260 includes removing the sacrificial pad material 311 in the coil trenches 309. For example, an etch appropriate for the pad materials may be used. FIG. 6D depicts the transducer 300 after this has been completed. Consequently, coil trenches 309' remain. In addition, a high conductivity material such as Au, Ag or Cu, is plated. A planarization may also be performed. FIG. 6E depicts the HAMR transducer 300 after step 260 is completed. Thus, coil turns 313 are shown.

Figure 6F:
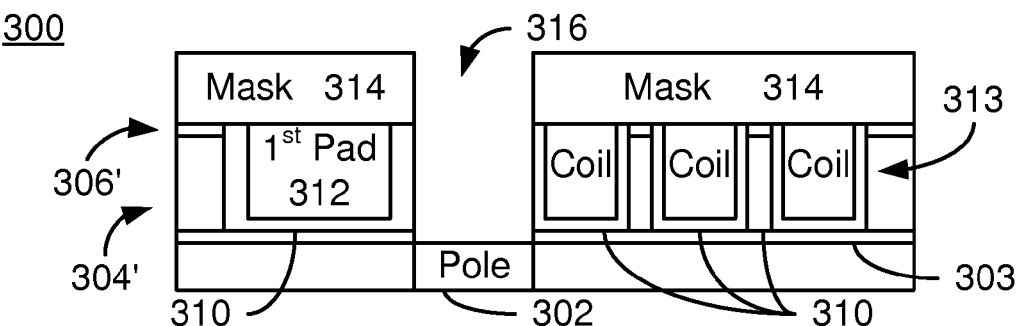
Figure 6G:
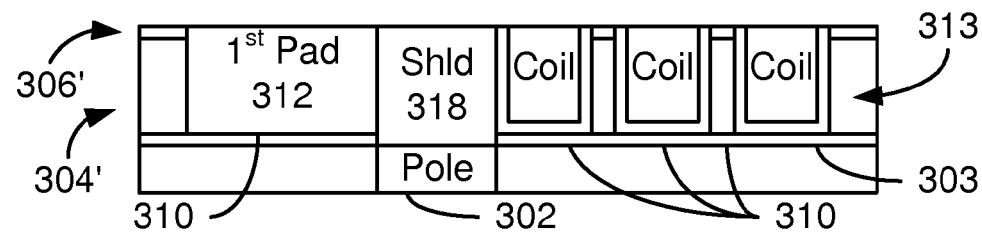

The portion of the first dielectric that resides in the location of the shield pedestal is removed, via step 262. In some embodiments, step 262 includes providing a mask having an aperture over the pole 302 and performing an RIE appropriate to the first dielectric layer 304'. For example, a silicon dioxide RIE may be performed. FIG. 6F depicts the HAMR transducer 300 after step 262 is performed. Thus, a mask 314 is shown. The mask 314 is used during step 262. Also shown is the shield pedestal trench 316 formed where a portion of the first dielectric layer 304' has been removed. The shield is provided in the shield pedestal trench, via step 264. Step 264 may include depositing a seed layer and plating the shield pedestal material, such as NiFe. Step 264 may also include planarizing the shield pedestal material. Thus, steps 262 and 264 may be considered analogous to part of step 206 in the method 200 depicted in FIG. 4. Referring back to FIGS. 5 and 6A-6J, FIG. 6G depicts the HAMR transducer 300 after step 264 is performed. Thus, shield pedestal 318 is shown.

Figure 6H:
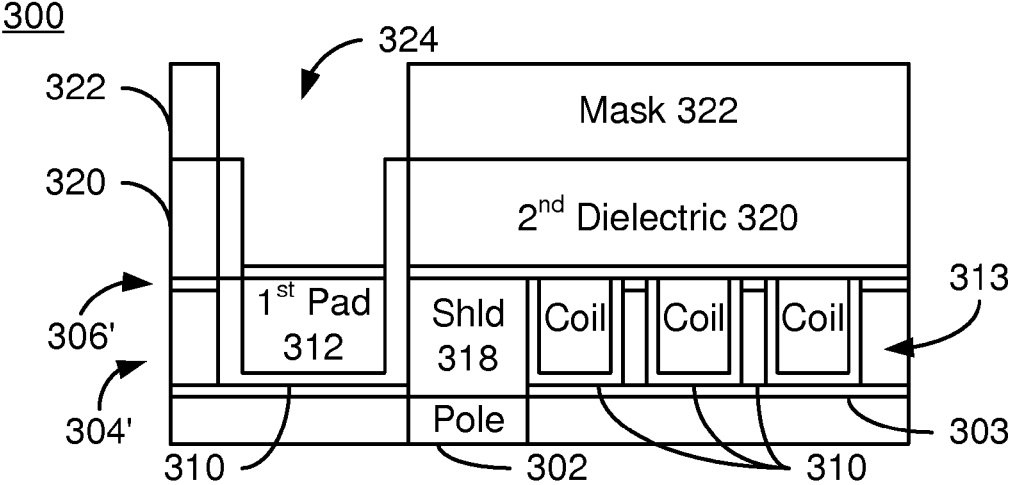

A second dielectric layer is provided, via step 266. In some embodiments, step 266 includes providing an insulating layer, such as aluminum oxide, then providing another dielectric layer. In some embodiments, the second dielectric layer is formed of the same material(s) as the first dielectric layer. For example, silicon dioxide and/or aluminum oxide may be used. An additional pad trench is provided in the second dielectric layer, via step 268. FIG. 6H depicts the HAMR transducer 300 after step 268 is performed. Thus, a mask 322 has been formed on the second dielectric layer 320. Second pad trench 324 has also been formed in the second dielectric layer 320.

Figure 6I:
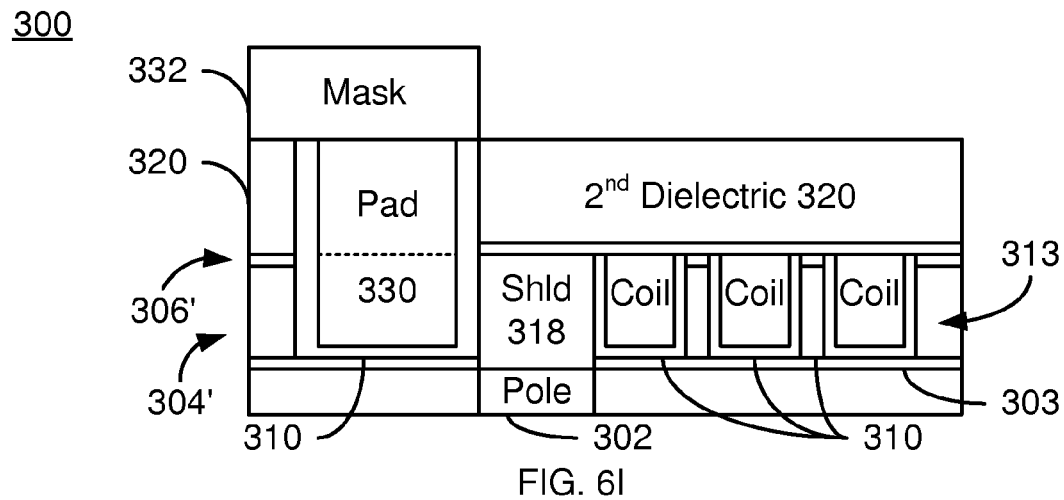

Additional protective pad materials are provided, via step 270. Step 270 may include depositing an insulating layer, such as aluminum oxide, to ensure that the desired spacing exists between the protective pad, the shield and/or other components. In some embodiments, the additional protective pad material is the same as used for the first portion of the protective pad in step 258. For example, NiFe may be used for one or both portions of the protective pad being formed. Thus, steps 266, 268 and 270 may be considered to be part of the step 208 depicted in FIG. 4. FIG. 6I depicts the HAMR transducer 300 after step 270 has been performed. Thus, the protective pad 330 is formed. The two layers deposited in steps 258 and 270 are denoted by the dotted line in the pad 330. In the embodiment shown, a mask 332 has been provided to cover the protective pad during subsequent steps.

Figure 6J:
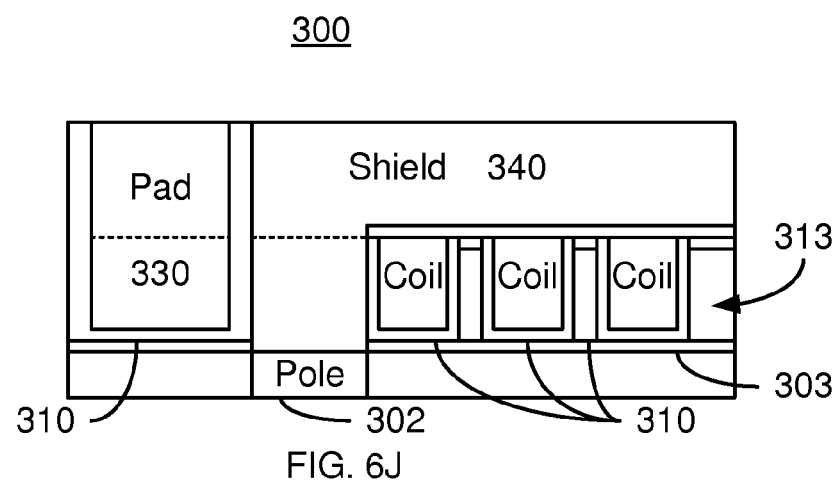

The remaining portion of the shield is provided in steps 272 and 274. The protective pad 330 is covered, via step 272. Thus, mask 332 of FIG. 6I is used. An exposed portion of the second dielectric layer is also removed in step 272. Thus, a trench is formed for the top portion of the shield. The top portion of the shield is then provided, via step 274. Step 274 may include depositing a seed layer, plating the material(s) for the shield and performing a planarization such as a CMP. In some embodiments, NiFe is used for the top portion of the shield. FIG. 6J depicts the HAMR transducer 300 after step 274 is performed. Thus, the shield 340 has been formed. The two layers forming the shield pedestal 318 and the remaining portion of the shield 340 are denoted by the dotted line in the shield 340.

Thus, using the method 250, the HAMR transducer 300 having protective pad 330 may be formed. The HAMR transducer 300 may thus share the benefits of the HAMR transducer 120. For example, improved robustness and wear resistance may be achieved.

Figure 7:
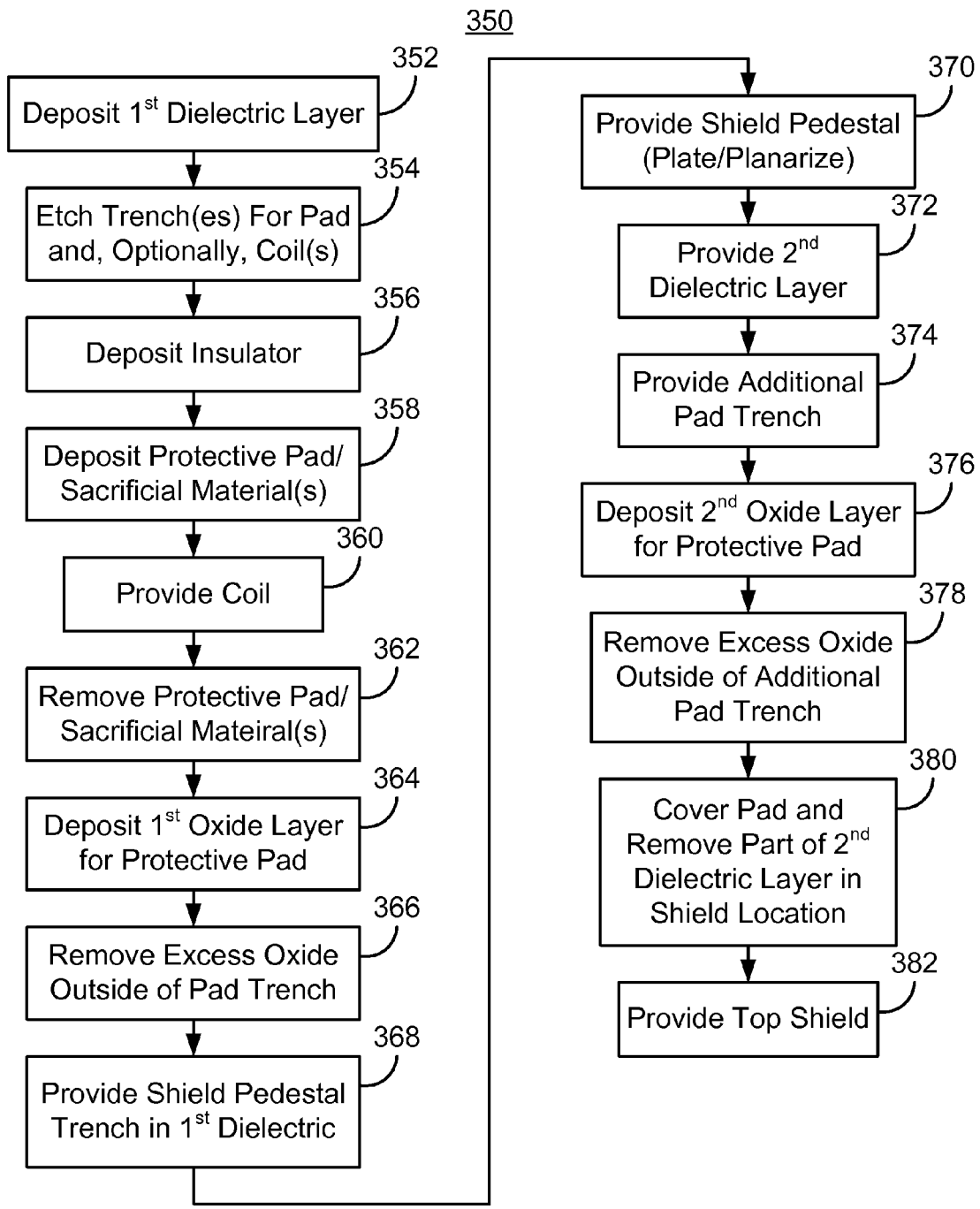
FIG. 7 depicts a flow chart depicting an exemplary embodiment of a method for fabricating a HAMR transducer.

FIG. 7 is a flow chart depicting an exemplary embodiment of a method 350 for fabricating a HAMR transducer. FIGS. 8A-8H depict an exemplary embodiment of a HAMR transducer 400 during formation using the method 350. The method 350 is described in the context of the HAMR transducer 400, though other transducers might be so fabricated. For simplicity, some steps may be omitted, performed in another order, and/or combined. The magnetic recording transducer being fabricated may be part of a merged head that also includes a read head (not shown) and resides on a slider in a disk drive. The method 350 is also described in the context of a single transducer. However, the method 350 may be used to fabricate multiple transducers at substantially the same time. The method 350 and system are also described in the context of particular layers and particular structures. However, in some embodiments, such layers may include multiple sub-layers and/or other structures. The method 350 also may commence after formation of other portions of the transducer. The method 350 and HAMR transducer 400 are also analogous to the method 250 and HAMR transducer 300. Thus, analogous steps and components are labeled similarly.

Figure 8A:
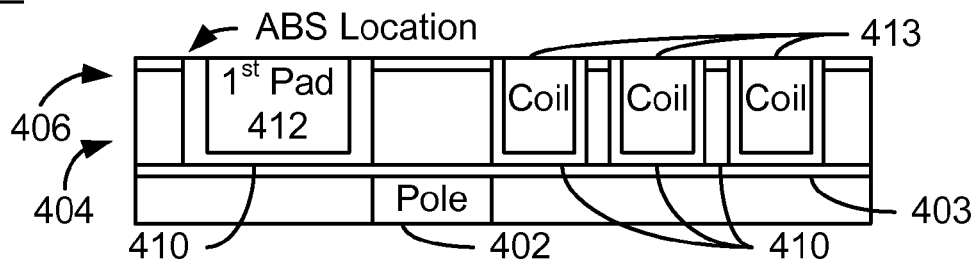
FIGS. 8A-8H are side views of another exemplary embodiment of a HAMR head disk drive during fabrication.

The method 350 starts after formation of the pole. Further, steps 352, 354, 356, 358 and 360 correspond to steps 252, 254, 256, 258 and 260, respectively. Thus, these steps are not separately discussed. FIG. 8A depicts the HAMR transducer 400 after step 360 has been completed. Thus, FIG. 8A depicts the pole 402, insulator 403, first dielectric layer 404, part of layer 406, insulator 410, first protective pad material 412 and coil 413 that are analogous to pole 302, insulator 303, dielectric layer 304', layer 306', insulator 310', first protective pad materials 312 and coil 313, respectively.

Figure 8B:
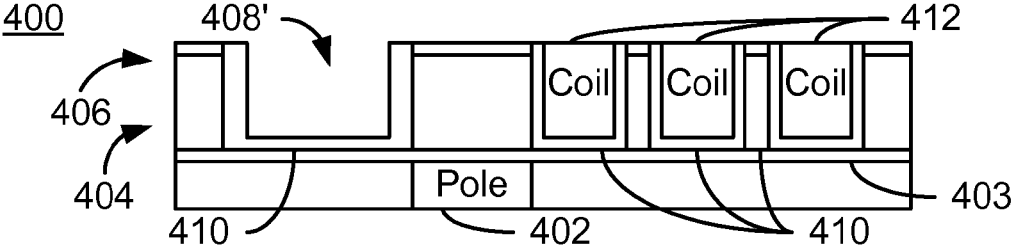
Figure 8C:
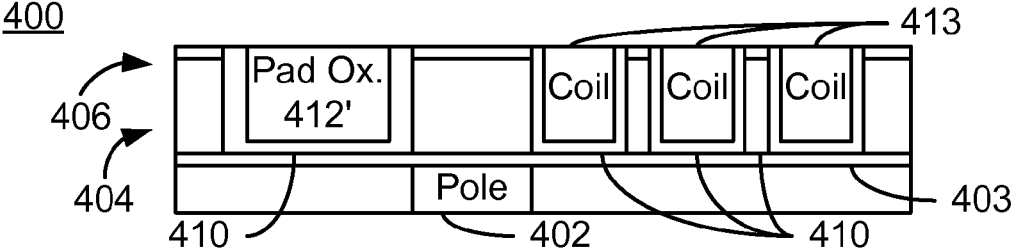

The protective pad material 412 in the pad trench is removed, via step 362. Step 362 may be performed via an etch or other mechanism. FIG. 8B depicts the HAMR transducer 400 after step 362 is performed. Thus, the first pad material 412 has been removed, leaving pad trench 408'. An oxide layer for the protective pad is then deposited, via step 364. In some embodiments, step 364 may include depositing a tantalum oxide layer. The excess portion of the oxide layer outside of the pad trench 412' is removed, via step 366. Steps 352, 354, 356, 360, 364 and 366 may be considered to be part of the step 208 of the method 200 depicted in FIG. 4. Referring back to FIGS. 7 and 8A-8H, FIG. 8C depicts the HAMR transducer after step 366 is performed. Thus, the pad oxide 412' is shown.

Figure 8D:
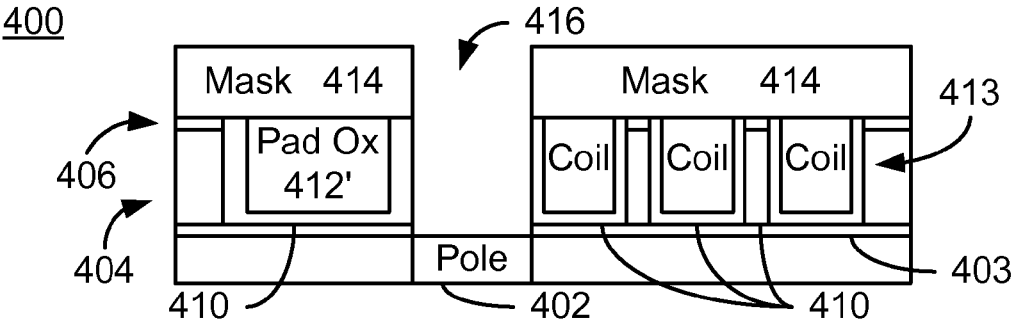
Figure 8E:
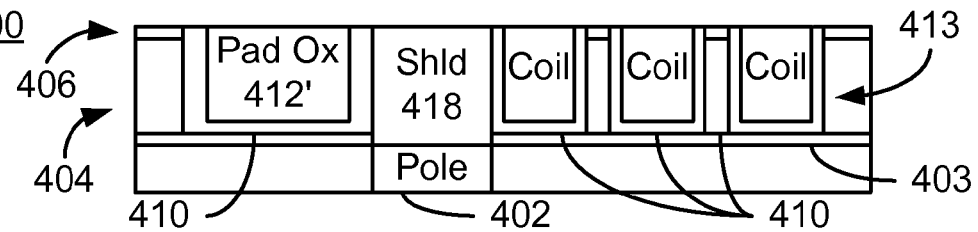
Figure 8F:
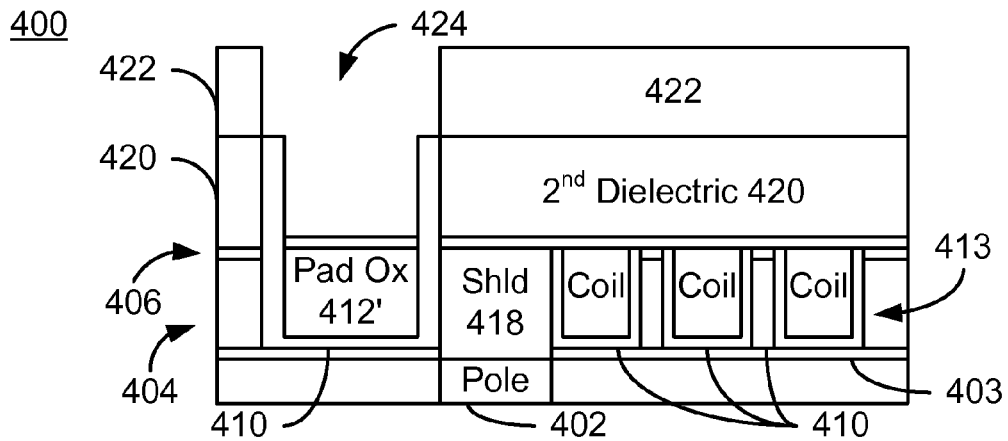

The portion of the first dielectric that resides in the location of the shield pedestal is removed, via step 368. Step 368 is analogous to step 262 of the method 200 depicted in FIG. 4. Referring back to FIGS. 7 and 8A-8H, in some embodiments, step 368 includes providing a mask having an aperture over the pole 402 and performing an RIE appropriate to the first dielectric layer 404. For example, a silicon dioxide RIE may be performed. FIG. 8D depicts the HAMR transducer 400 after step 368 is performed. Thus, a mask 414 is shown. The mask 414 is used during step 368. Also shown is the shield pedestal trench 416 formed where a portion of the first dielectric layer 404 has been removed. The shield is provided in the shield pedestal trench, via step 370. Step 370 is analogous to step 264 of the method 200 depicted in FIG. 4. Referring back to FITS. 7 and 8A-8H, step 370 may include depositing a seed layer and plating the shield pedestal material, such as NiFe. Step 370 may also include planarizing the shield pedestal material. Thus, steps 368 and 370 may be considered analogous to part of step 206 in the method 200 depicted in FIG. 4. Referring back to FIGS. 7 and 8A-8H, FIG. 8E depicts the HAMR transducer 400 after step 370 is performed. Thus, shield pedestal 418 is shown.

A second dielectric layer is provided, via step 372. Step 372 is analogous to step 266 of the method 200 depicted in FIG. 4. Referring back to FIGS. 7 and 8A-8H, in some embodiments, step 372 includes providing an insulating layer, such as aluminum oxide, then providing another dielectric layer. In some embodiments, the second dielectric layer is formed of the same material(s) as the first dielectric layer. For example, silicon dioxide and/or aluminum oxide may be used. An additional pad trench is provided in the second dielectric layer, via step 374. Step 374 is analogous to step 268 of the method 200 depicted in FIG. 4. Referring back to FIGS. 7 and 8A-8H, FIG. 8F depicts the HAMR transducer 400 after step 374 is performed. Thus, a mask 422 has been formed on the second dielectric layer 420. Second pad trench 424 has also been formed in the second dielectric layer 420.

Figure 8G:
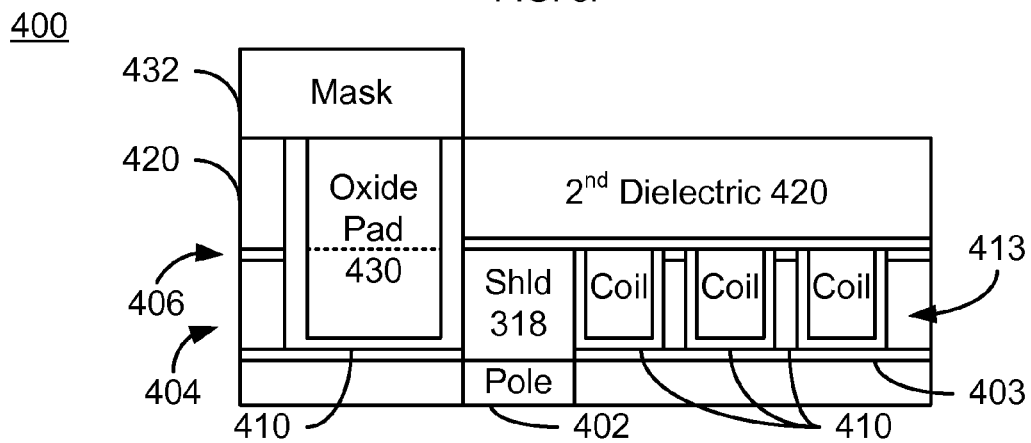

The second oxide layer for the protective pad is deposited, via step 376. Step 376 may include depositing a tantalum oxide layer or other layer. The excess portion of the oxide layer outside of the additional pad trench is removed, via step 378. Thus, steps 372, 374, 376 and 378 may be considered to be part of the step 208 depicted in FIG. 4. FIG. 8G depicts the HAMR transducer 400 after step 378 has been performed. Thus, the protective pad 430 is formed. The two layers forming the oxide pad 430 are denoted by the dotted line in the pad 430. The pad 430 is thus analogous to the pad 330, but expressly includes an oxide such as tantalum oxide. In the embodiment shown, a mask 432 has been provided to cover the protective pad during subsequent steps.

Figure 8H:
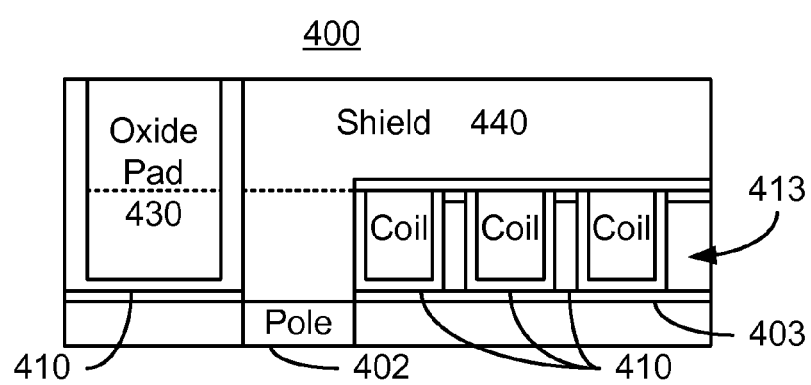

The remaining portion of the shield is provided in steps 380 and 382. The protective pad 430 is covered, via step 380. Thus, mask 432 of FIG. 8G is used. An exposed portion of the second dielectric layer is also removed in step 380. Thus, a trench is formed for the top portion of the shield. The top portion of the shield is then provided, via step 382. Step 382 may include depositing a seed layer, plating the material(s) for the shield and performing a planarization such as a CMP. In some embodiments, NiFe is used for the top portion of the shield. FIG. 8H depicts the HAMR transducer 400 after step 382 is performed. Thus, the shield 440 has been formed. The two layers forming the shield pedestal 418 and the remaining portion of the shield 440 are denoted by the dotted line in the shield 440.

Thus, using the method 350, the HAMR transducer 400 having protective pad 330 may be formed. The HAMR transducer 400 may thus share the benefits of the HAMR transducers 120 and/or 300. For example, improved robustness and wear resistance may be achieved.

Figure 9:
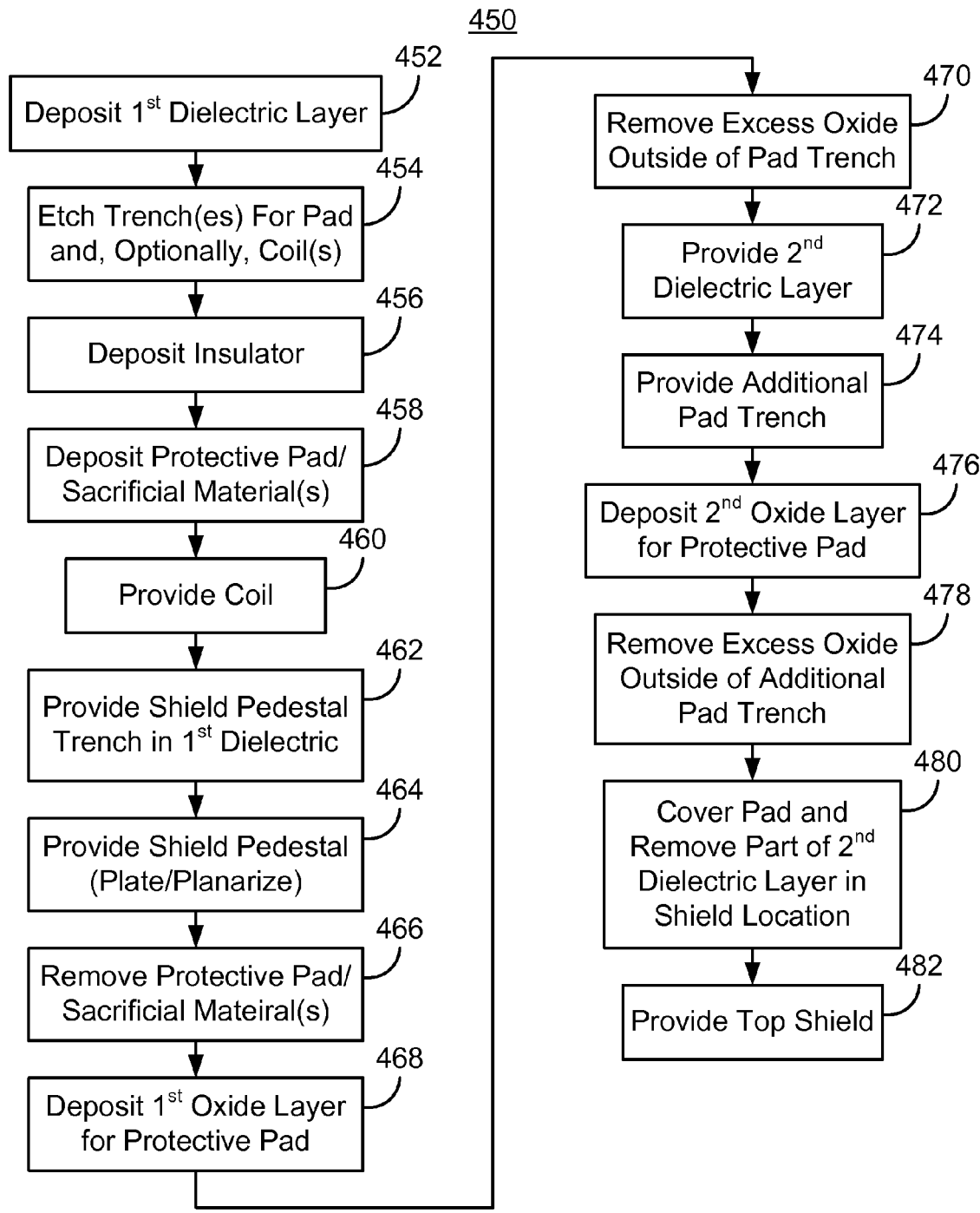
FIG. 9 depicts a flow chart depicting an exemplary embodiment of a method for fabricating a HAMR transducer.

FIG. 9 is a flow chart depicting an exemplary embodiment of a method 450 for fabricating a HAMR transducer. FIGS. 10A-10F depict an exemplary embodiment of a HAMR transducer 500 during formation using the method 450. The method 450 is described in the context of the HAMR transducer 400, though other transducers might be so fabricated. For simplicity, some steps may be omitted, performed in another order, and/or combined. The magnetic recording transducer being fabricated may be part of a merged head that also includes a read head (not shown) and resides on a slider in a disk drive. The method 450 is also described in the context of a single transducer. However, the method 450 may be used to fabricate multiple transducers at substantially the same time. The method 450 and system are also described in the context of particular layers and particular structures. However, in some embodiments, such layers may include multiple sub-layers and/or other structures. The method 450 also may commence after formation of other portions of the transducer. The method 450 and HAMR transducer 500 are also analogous to the method 250/350 and HAMR transducer 300/400. Thus, analogous steps and components are labeled similarly.

Figure 10A:
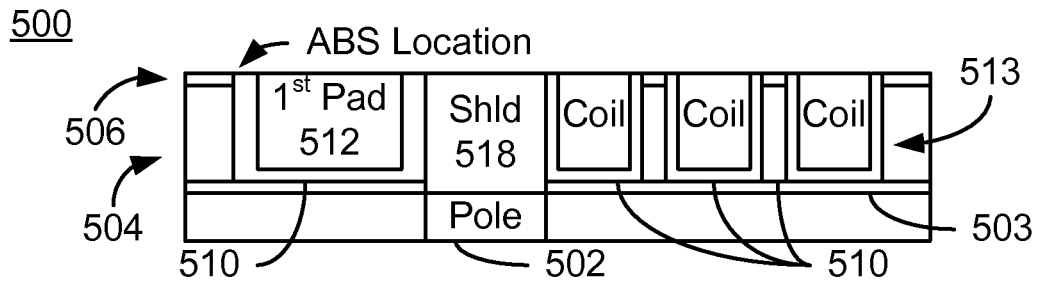
FIGS. 10A-10F are side views of another exemplary embodiment of a HAMR head disk drive during fabrication.

The method 450 starts after formation of the pole. Further, steps 452, 454, 456, 458, 460, 462 and 464 correspond to steps 252, 254, 256, 258, 260, 262 and 264, respectively. Thus, these steps are not separately discussed. FIG. 10A depicts the HAMR transducer 400 after step 464 has been completed. Thus, FIG. 10A depicts the pole 502, insulator 503, first dielectric layer 504, part of layer 506, insulator 510, first protective pad material 512, coil 513 and shield pedestal 518 that are analogous to pole 302/402, insulator 303/403, dielectric layer 304'/404, layer 306'/406, insulator 310'/410, first protective pad materials 312/412, coil 313/413 and shield pedestal 318/418, respectively.

Figure 10B:
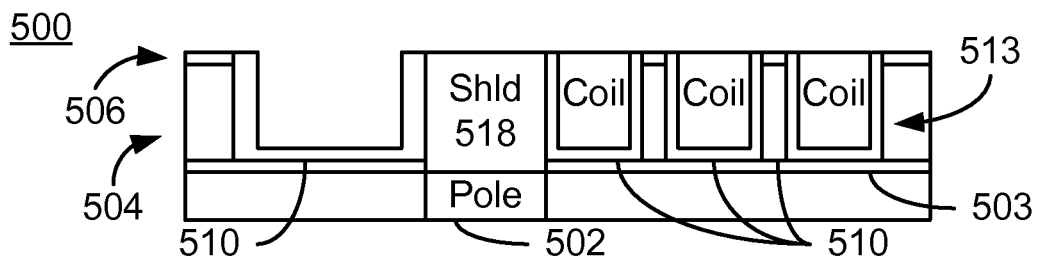
Figure 10C:
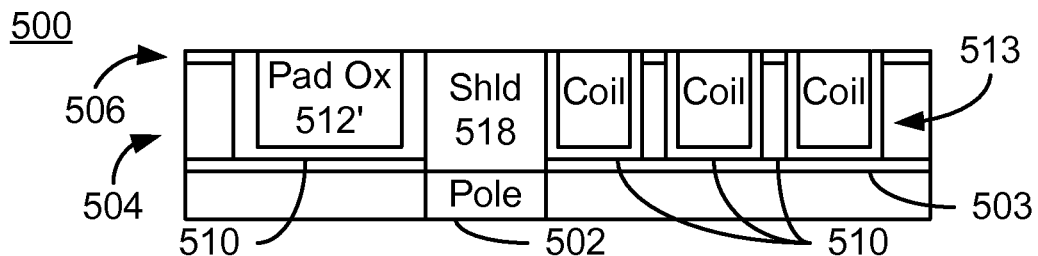
Figure 10D:
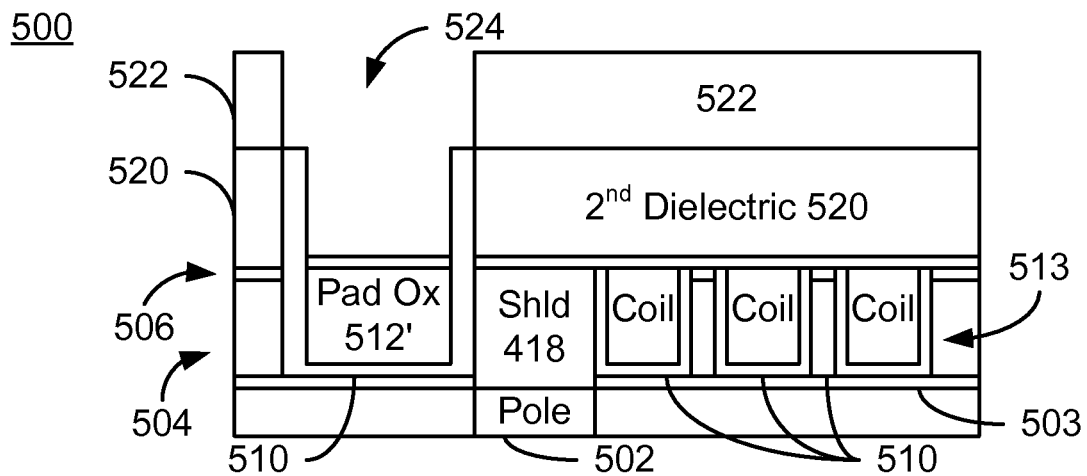

The protective pad material 512 in the pad trench is removed, via step 466. Step 466 is analogous to step 362 and may be performed via an etch or other mechanism. FIG. 10B depicts the HAMR transducer 500 after step 466 is performed. Thus, the first pad material 512 has been removed, leaving pad trench 508. An oxide layer for the protective pad is then deposited, via step 468. In some embodiments, step 468 may include depositing a tantalum oxide layer. The excess portion of the oxide layer outside of the pad trench 512 is removed, via step 470. Step 470 is analogous to step 366. Steps 452, 454, 456, 458, 462, 468 and 470 may be considered to be part of the step 208 of the method 200 depicted in FIG. 4. Referring back to FIGS. 9 and 10A-8F, FIG. 10C depicts the HAMR transducer 500 after step 470 is performed. Thus, the pad oxide 512' is shown.

A second dielectric layer is provided, via step 472. Step 472 is analogous to step 266 of the method 200 depicted in FIG. 4. Referring back to FIGS. 9 and 10A-10F, in some embodiments, step 472 includes providing an insulating layer, such as aluminum oxide, then providing another dielectric layer. In some embodiments, the second dielectric layer is formed of the same material(s) as the first dielectric layer. For example, silicon dioxide and/or aluminum oxide may be used. An additional pad trench is provided in the second dielectric layer, via step 474. Step 474 is analogous to step 268 of the method 200 depicted in FIG. 4. Referring back to FIGS. 9 and 10A-10F, FIG. 10D depicts the HAMR transducer 500 after step 474 is performed. Thus, a mask 522 has been formed on the second dielectric layer 520. Second pad trench 524 has also been formed in the second dielectric layer 520.

Figure 10E:
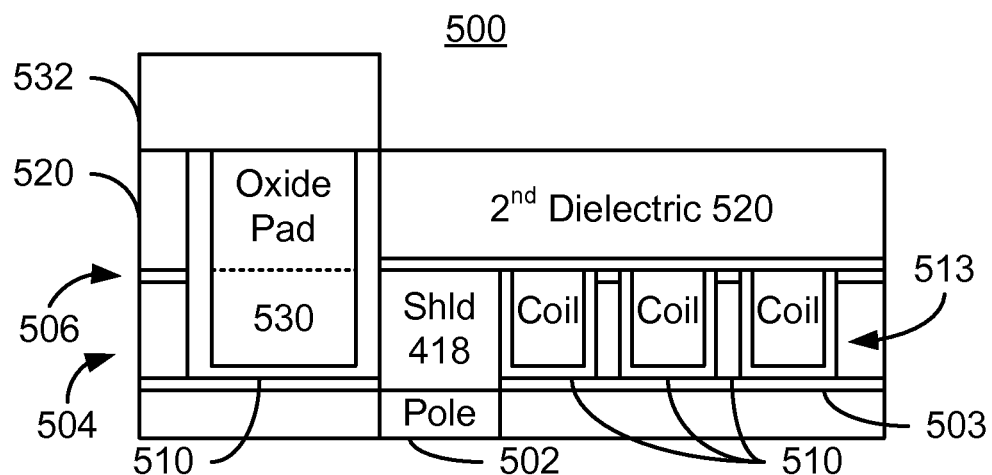
Figure 10F:
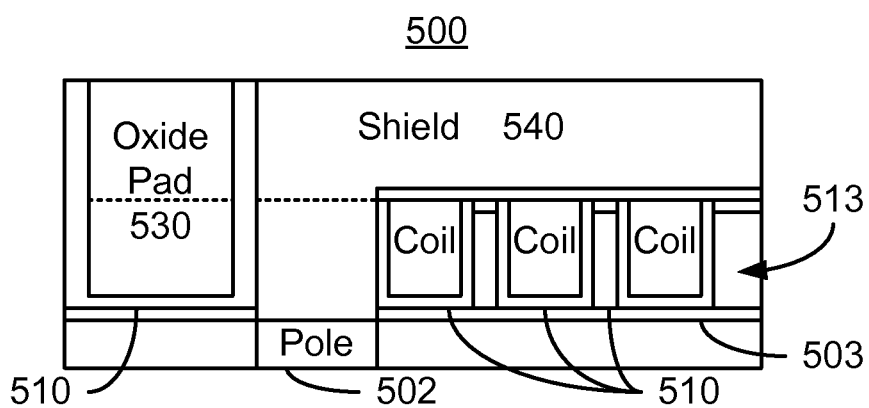

The second oxide layer for the protective pad is deposited, via step 476. Step 476 may include depositing a tantalum oxide layer or other layer. The excess portion of the oxide layer outside of the additional pad trench is removed, via step 478. Thus, steps 472, 474, 476 and 478 may be considered to be part of the step 208 depicted in FIG. 4. FIG. 10E depicts the HAMR transducer 500 after step 478 has been performed. Thus, the protective pad 530 is formed. The two layers forming the oxide pad 530 are denoted by the dotted line in the pad 530. The pad 530 is thus analogous to the pad 330/430. In the embodiment shown, a mask 532 has been provided to cover the protective pad during subsequent steps.

The remaining portion of the shield is provided in steps 480 and 482. The protective pad 530 is covered, via step 480. Thus, mask 432 of FIG. 10E is used. An exposed portion of the second dielectric layer is also removed in step 480. Thus, a trench is formed for the top portion of the shield. The top portion of the shield is then provided, via step 482. Step 482 may include depositing a seed layer, plating the material(s) for the shield and performing a planarization such as a CMP. In some embodiments, NiFe is used for the top portion of the shield. FIG. 8H depicts the HAMR transducer 500 after step 482 is performed. Thus, the shield 540 has been formed. The two layers forming the shield pedestal 518 and the remaining portion of the shield 540 are denoted by the dotted line in the shield 540.

Thus, using the method 450, the HAMR transducer 500 having protective pad 430 may be formed. The HAMR transducer 500 may thus share the benefits of the HAMR transducers 120, 300 and/or 400. For example, improved robustness and wear resistance may be achieved.

We claim:

1. A method for providing heat assisted magnetic recording (HAMR) transducer having air-bearing surface (ABS) corresponding to an ABS location and being optically coupled with a laser, the method comprising:
   providing a waveguide for directing light from the laser toward the ABS
   providing a write pole having a pole tip with an ABS location facing surface, the pole tip being in a down track direction from the waveguide;
   providing at least one shield including a shield pedestal, the shield pedestal being in the down track direction from the pole tip such that the write pole is between the at least a portion of the at least one shield and the waveguide, the shield pedestal including an ABS-facing surface, the ABS-facing surface of the shield pedestal being a closest portion of the shield to the ABS location, the shield pedestal being magnetic; and
   providing at least one protective pad adjacent to the write pole and residing between the ABS location and the shield pedestal, the step of providing the at least one protective pad further including
      providing a first dielectric layer, a portion of the first dielectric layer residing on the pole tip;
      providing a plurality of trenches in the dielectric layer, the plurality of trenches including at least a first protective pad trench in the dielectric layer, the at least the first protective pad trench having a location corresponding to the at least one protective pad;
      providing at least a first protective pad material in the at least the first protective pad trench;
      depositing an insulating layer;
      providing a second dielectric layer on the insulating layer;
      providing at least a second protective pad trench in the second dielectric layer; and
      providing at least a second protective pad material in the second protective pad trench.

2. The method of claim 1 wherein the plurality of trenches include a plurality of coil trenches, wherein a sacrificial portion of the at least the first protective pad material resides in the plurality of coil trenches after the step of providing the first protective pad material, and wherein the method further includes:
   removing the sacrificial portion of the at least one first protective pad material before the step of providing the second dielectric layer; and
   plating at least one coil in the plurality of coil trenches before the step of providing the second dielectric layer.

3. The method of claim 1 wherein the at least the first protective pad material and the at least the second protective pad material each includes NiFe.

4. The method of claim 1 wherein the at least one protective pad includes at least one of NiFe, tantalum oxide, CoNiFe, Ta and aluminum nitride.

5. The method of claim 1 wherein the at least one protective pad occupies a portion of the ABS.

6. The method of claim 1 wherein the step of providing the at least one protective pad further includes:
   depositing an insulator after the step of providing the plurality of trenches and before the step of providing the first protective pad material.

7. The method of claim 6 wherein the step of providing the shield further includes:
   providing a shield pedestal trench in the first dielectric layer, the at least the first protective pad trench residing between the shield pedestal trench and the ABS location;
   providing at least one shield material in the shield pedestal trench to form the shield pedestal.

8. The method of claim 7 wherein the step of providing the at least one shield material further includes:
   plating the at least one shield material; and
   performing a planarization.

9. The method of claim 8 wherein the step of providing the shield further includes:
   removing at least a portion of the second dielectric layer to form a second shield trench, the second protective pad trench residing between the ABS location and the second shield trench; and
   providing at least an additional shield material residing in the second shield trench contacting the at least one shield material in the first shield trench.

10. A method for providing heat assisted magnetic recording (HAMR) transducer having air-bearing surface (ABS) corresponding to an ABS location and being optically coupled with a laser, the method comprising:
   providing a waveguide for directing light from the laser toward the ABS
   providing a write pole having a pole tip with an ABS location facing surface, the pole tip being in a down track direction from the waveguide;
   providing at least one shield including a shield pedestal, the shield pedestal being in the down track direction from the pole tip; and
   providing at least one protective pad adjacent to the write pole and residing between the ABS location and the shield pedestal, wherein the step of providing the at least one protective pad further includes providing a first dielectric layer, a portion of the first dielectric layer residing on the pole tip;
providing a plurality of trenches in the dielectric layer, the plurality of trenches including at least a first protective pad trench in the dielectric layer, the at least the first protective pad trench having a location corresponding to the at least one protective pad;
providing at least a first protective pad material in the at least the first protective pad trench;
depositing an insulating layer;
removing the at least the first protective pad material;
depositing a first tantalum oxide layer, a first portion of the first tantalum oxide layer residing in the at least the first protective pad trench;
removing a second portion of the first tantalum oxide layer outside of the at least the first protective pad trench using at least one of a first tantalum oxide reactive ion etch (RIE) and a first planarization;
providing a second dielectric layer on the insulating layer after the step of removing the first protective pad material, after the step of removing the at least the first protective pad material, and after the step of depositing the first tantalum oxide layer;
providing at least a second protective pad trench in the second dielectric layer;
providing at least a second protective pad material in the second protective pad trench;
removing the at least the second protective pad material in the second protective pad trench thereby exposing a third portion of the first tantalum oxide layer; and
depositing a second tantalum oxide layer, a portion of the second tantalum oxide layer residing in the second protective pad trench;
removing an external portion of the second tantalum oxide layer outside of the second protective pad trench using at least one of a second tantalum oxide RIE and a second planarization.

11. A method for providing heat assisted magnetic recording (HAMR) transducer having air-bearing surface (ABS) corresponding to an ABS location and being optically coupled with a laser, the method comprising:
providing a waveguide for directing light from the laser toward the ABS
providing a write pole having a pole tip with an ABS location facing surface, the pole tip being in a down track direction from the waveguide;
providing a first dielectric layer, a portion of the first dielectric layer residing on the pole tip;
providing a plurality of trenches in the dielectric layer, the plurality of trenches including a first protective pad trench and a plurality of coil trenches, the first protective pad trench having a location corresponding to the at least one protective pad;
depositing a first insulating layer in at least the first protective pad trench;
providing at least a first protective pad layer in the plurality of trenches;
performing a first planarization;
removing a first portion of the at least the first protective pad layer in the plurality of coil trenches;
plating a conductive layer in the plurality of coil trenches;
depositing a second insulating layer;
providing a second dielectric layer on the second insulating layer;
providing at least a second protective pad trench in the second dielectric layer;

providing at least a second protective pad layer in the second protective pad trench;
providing a shield having a shield pedestal adjacent to the first protective pad trench and including an ABS-facing surface, the ABS-facing surface of the shield pedestal being a closest portion of the shield to the ABS location.

12. The method of claim 11 wherein the at least one protective pad includes at least one of NiFe, tantalum oxide, CoNiFe, Ta and aluminum nitride.

13. The method of claim 11 wherein the at least one protective pad occupies a portion of the ABS.

14. The method of claim 11 wherein the step of providing the shield further includes:
providing a shield pedestal trench in the first dielectric layer, the first protective pad trench residing between the shield pedestal trench and the ABS location, the shield pedestal trench residing between the first protective pad trench and the plurality of coil trenches;
providing at least one shield material in the shield pedestal trench to form the shield pedestal.

15. The method of claim 14 wherein the step of providing the at least one shield material further includes:
plating the at least one shield material; and
performing a planarization.

16. The method of claim 14 wherein the step of providing the shield further includes forming a top shield, a first portion of the top shield adjoining the shield pedestal, a second portion of the top shield residing in the down track direction from the coil.

17. The method of claim 16 wherein the step of providing the top shield further includes:
removing at least a portion of the second dielectric layer to form a second shield trench, the second protective pad trench residing between the ABS location and the second shield trench; and
providing at least an additional shield material residing in the second shield trench contacting the at least one shield material in the first shield trench.

18. A method for providing heat assisted magnetic recording (HAMR) transducer having air-bearing surface (ABS) corresponding to an ABS location and being optically coupled with a laser, the method comprising:
providing a waveguide for directing light from the laser toward the ABS
providing a write pole having a pole tip with an ABS location facing surface, the pole tip being in a down track direction from the waveguide;
providing a first dielectric layer, a portion of the first dielectric layer residing on the pole tip;
providing a plurality of trenches in the dielectric layer, the plurality of trenches including a first protective pad trench and a plurality of coil trenches, the first protective pad trench having a location corresponding to the at least one protective pad;
depositing a first insulating layer in at least the first protective pad trench;
providing at least a first protective pad layer in the plurality of trenches;
performing a first planarization;
removing a first portion of the at least the first protective pad layer in the plurality of coil trenches;
plating a conductive layer in the plurality of coil trenches;
depositing a second insulating layer;
providing a second dielectric layer on the second insulating layer;
providing at least a second protective pad trench in the second dielectric layer;

providing at least a second protective pad layer in the second protective pad trench; and providing a shield having a shield pedestal adjacent to the first protective pad trench, the shield being a top shield, a first portion of the top shield adjoining the shield pedestal, a second portion of the top shield residing in the down track direction from the coil, the step of providing the shield further including providing a shield pedestal trench in the first dielectric layer, the first protective pad trench residing between the shield pedestal trench and the ABS location, the shield pedestal trench residing between the first protective pad trench and the plurality of coil trenches; and providing at least one shield material in the shield pedestal trench to form the shield pedestal;

wherein the step of providing the at least one protective pad further includes:

removing a second portion of the at least the first protective pad layer in the first protective pad trench before the step of providing the second dielectric layer and before the step of providing the top shield;

depositing a first tantalum oxide layer before the step of providing the top shield, a first portion of the first tantalum oxide layer residing in the first protective pad trench;

removing a second portion of the first tantalum oxide layer outside of the first protective pad trench using at least one of a first tantalum oxide reactive ion etch (RIE) and a first planarization, the step of removing the second portion of the first tantalum oxide layer being performed before the step of providing the second dielectric layer and before the step of providing the top shield;

removing the at least the second protective pad layer in the second protective pad trench before the step of providing the top shield;

depositing a second tantalum oxide layer before the step of providing the top shield, a portion of the second tantalum oxide layer residing in the second protective pad trench; and removing an external portion of the second tantalum oxide layer outside of the second protective pad trench using at least one of a second tantalum oxide RIE and a second planarization, the step of removing the external portion of the second tantalum oxide layer being performed before the step of providing the second dielectric layer and before the step of providing the top shield.

19. The method of claim 18 wherein the steps of removing the second portion of the at least the first protective layer, depositing the first tantalum oxide layer and removing the second portion of the first tantalum oxide layer are performed before the step of providing the shield pedestal trench.

20. The method of claim 18 wherein the steps of removing the second portion of the at least the first protective layer, depositing the first tantalum oxide layer, removing the second portion of the first tantalum oxide layer, removing the at least the second protective pad layer, depositing the second tantalum oxide layer and removing the external portion of the second tantalum oxide layer are performed after the steps of providing the shield pedestal trench and providing the at least one shield material in the shield pedestal trench.

* * * * *